(12) United States Patent
Lee

(10) Patent No.: US 8,102,878 B2
(45) Date of Patent: Jan. 24, 2012

(54) VIDEO PACKET SHAPING FOR VIDEO TELEPHONY

(75) Inventor: Yen-Chi Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1391 days.

(21) Appl. No.: 11/240,133

(22) Filed: Sep. 29, 2005

(65) Prior Publication Data

US 2007/0071030 A1    Mar. 29, 2007

(51) Int. Cl.
*H04J 3/16* (2006.01)
*H04J 3/22* (2006.01)
*H04J 3/12* (2006.01)
*H04J 3/02* (2006.01)

(52) U.S. Cl. ............... 370/468; 370/528; 370/538
(58) Field of Classification Search ........... 370/468, 370/528, 538; 348/385, 387
See application file for complete search history.

(56) References Cited

U.S. PATENT DOCUMENTS

| | | | |
|---|---|---|---|
| 4,774,587 A | 9/1988 | Schmitt | |
| 5,341,374 A | 8/1994 | Lewen et al. | |
| 5,367,523 A | 11/1994 | Chang et al. | |
| 5,541,919 A | 7/1996 | Yong et al. | |
| 5,550,589 A * | 8/1996 | Shiojiri et al. | 348/386.1 |
| 5,550,593 A * | 8/1996 | Nakabayashi | 348/465 |
| 5,621,840 A * | 4/1997 | Kawamura et al. | 386/68 |
| 5,768,533 A | 6/1998 | Ran | |
| 5,790,538 A | 8/1998 | Sugar | |
| 5,802,068 A * | 9/1998 | Kudo | 370/538 |
| 5,838,678 A * | 11/1998 | Davis et al. | 370/389 |
| 5,969,764 A | 10/1999 | Sun et al. | |
| 6,111,917 A | 8/2000 | Tomita et al. | |
| 6,154,489 A | 11/2000 | Kleider et al. | |
| 6,233,251 B1 * | 5/2001 | Kurobe et al. | 370/471 |
| 6,389,034 B1 | 5/2002 | Guo et al. | |
| 6,396,956 B1 | 5/2002 | Ribas-Corbera et al. | |
| 6,404,776 B1 * | 6/2002 | Voois et al. | 370/468 |

(Continued)

FOREIGN PATENT DOCUMENTS

CN    1272271    11/2000

(Continued)

OTHER PUBLICATIONS

3GPP2 C.S0024-A: "cdma2000 High rate Packet Data Air Interface Specification," version 1.0, p. 11-143, Mar. 2004.

(Continued)

*Primary Examiner* — Chi Pham
*Assistant Examiner* — Farah Faroul
(74) *Attorney, Agent, or Firm* — Kevin T. Cheatham

(57) ABSTRACT

The disclosure relates to techniques for video packet shaping for video telephony (VT). The techniques can be used to prioritize audio packets to reduce audio delay. Channel conditions, excessive video content, or both can cause delays in audio transmission. When reverse link (RL) throughput is reduced, video packet size can overwhelm the RL and increase audio delay. The video packet may consume an excessive number of MAC RLP packets, resulting in delays between successive audio packets. The size of each video packet is adjusted so that audio packets are prioritized for transmission without substantial delay. The video packet size may be controlled based on channel conditions. The audio can be conveyed without substantial delay, even though the video may suffer from delay due to channel conditions. Although video may be compromised by channel conditions, video packet shaping ensures that the VT parties are able to smoothly carry on verbal conversation.

40 Claims, 7 Drawing Sheets

U.S. PATENT DOCUMENTS

| | | |
|---|---|---|
| 6,421,387 B1 | 7/2002 | Rhee |
| 6,487,316 B1 | 11/2002 | Fukunaga et al. |
| 6,490,243 B1 | 12/2002 | Tanaka et al. |
| 6,574,247 B1 | 6/2003 | Baggen et al. |
| 6,587,437 B1 | 7/2003 | Lee et al. |
| 6,629,318 B1 | 9/2003 | Radha et al. |
| 6,633,609 B1* | 10/2003 | Ing et al. ............... 375/240.03 |
| 6,747,991 B1 | 6/2004 | Hemy et al. |
| 6,862,298 B1 | 3/2005 | Smith et al. |
| 6,865,374 B2 | 3/2005 | Kalluri |
| 6,891,822 B1* | 5/2005 | Gubbi et al. ............... 370/345 |
| 7,023,915 B2 | 4/2006 | Pian et al. |
| 7,051,358 B2 | 5/2006 | Hakenberg et al. |
| 7,058,085 B2 | 6/2006 | Earnshaw et al. |
| 7,068,086 B2 | 6/2006 | Takeda |
| 7,193,966 B2 | 3/2007 | Gupta et al. |
| 7,197,026 B2 | 3/2007 | Chen et al. |
| 7,206,285 B2 | 4/2007 | Loguinov |
| 7,269,139 B1 | 9/2007 | Williams, Jr. et al. |
| 7,304,951 B2 | 12/2007 | Rhee |
| 7,342,880 B2 | 3/2008 | Yanagihara et al. |
| 7,342,901 B1 | 3/2008 | Zhang et al. |
| 7,356,079 B2 | 4/2008 | Laksono et al. |
| 7,369,497 B2 | 5/2008 | Naruse |
| 7,369,517 B2 | 5/2008 | Dillinger et al. |
| 7,433,408 B2 | 10/2008 | Hatano et al. |
| 7,453,938 B2 | 11/2008 | Haskell et al. |
| 7,492,710 B2 | 2/2009 | Wadekar et al. |
| 7,533,192 B2 | 5/2009 | Otsuka et al. |
| 7,606,427 B2 | 10/2009 | Malayath et al. |
| 7,840,412 B2* | 11/2010 | Aprea et al. ............... 704/503 |
| 2002/0007416 A1* | 1/2002 | Putzolu ............... 709/231 |
| 2002/0031336 A1* | 3/2002 | Okada et al. ............... 386/96 |
| 2002/0054578 A1 | 5/2002 | Zhang et al. |
| 2002/0154640 A1 | 10/2002 | Wei |
| 2002/0191544 A1 | 12/2002 | Cheng et al. |
| 2002/0191722 A1 | 12/2002 | Naruse |
| 2003/0012212 A1 | 1/2003 | Earnshaw et al. |
| 2003/0026277 A1 | 2/2003 | Pate et al. |
| 2003/0054769 A1 | 3/2003 | Kalluri |
| 2003/0095594 A1* | 5/2003 | Laksono et al. ......... 375/240.03 |
| 2003/0152032 A1 | 8/2003 | Yanagihara et al. |
| 2004/0076118 A1 | 4/2004 | Ho et al. |
| 2004/0240558 A1 | 12/2004 | Hatano et al. |
| 2004/0252761 A1 | 12/2004 | Brown et al. |
| 2005/0013244 A1 | 1/2005 | Parlos |
| 2005/0013245 A1 | 1/2005 | Sreemanthula et al. |
| 2005/0117056 A1* | 6/2005 | Aprea et al. ............... 348/462 |
| 2005/0175093 A1 | 8/2005 | Haskell et al. |
| 2005/0207392 A1 | 9/2005 | Sivalingham et al. |
| 2005/0210515 A1 | 9/2005 | Roh et al. |
| 2005/0243846 A1 | 11/2005 | Mallila |
| 2005/0249231 A1 | 11/2005 | Khan |
| 2005/0259694 A1* | 11/2005 | Garudadri et al. ............ 370/503 |
| 2005/0283809 A1 | 12/2005 | Kim |
| 2006/0007958 A1* | 1/2006 | Kang et al. ............... 370/476 |
| 2006/0013263 A1 | 1/2006 | Fellman |
| 2006/0050743 A1 | 3/2006 | Black et al. |
| 2006/0072832 A1 | 4/2006 | Nemiroff et al. |
| 2006/0256756 A1 | 11/2006 | Wakabayashi |
| 2007/0019931 A1* | 1/2007 | Sirbu ............... 386/96 |
| 2007/0071030 A1 | 3/2007 | Lee |
| 2007/0091815 A1 | 4/2007 | Tinnakornsrisuphap et al. |
| 2007/0097257 A1* | 5/2007 | El-Maleh et al. ........... 348/419.1 |
| 2007/0201406 A1 | 8/2007 | Yoon et al. |
| 2007/0291870 A1 | 12/2007 | Ponnekanti |
| 2008/0056125 A1 | 3/2008 | Kneckt et al. |
| 2008/0170500 A1 | 7/2008 | Ito et al. |
| 2008/0205856 A1 | 8/2008 | Kim et al. |
| 2009/0034610 A1 | 2/2009 | Lee et al. |
| 2009/0046743 A1 | 2/2009 | Hamanaka |
| 2010/0215053 A1 | 8/2010 | Chakareski et al. |

FOREIGN PATENT DOCUMENTS

| | | |
|---|---|---|
| CN | 1273011 | 11/2000 |
| CN | 1293871 | 5/2001 |
| CN | 1674676 A | 9/2005 |
| EP | 1014739 | 6/2000 |
| EP | 1168732 | 1/2002 |
| EP | 1170957 | 1/2002 |
| EP | 1261163 | 11/2002 |
| EP | 1372304 A2 | 12/2003 |
| EP | 1478137 A1 | 11/2004 |
| EP | 1482681 | 12/2004 |
| EP | 1575225 A2 | 9/2005 |
| EP | 1628446 A1 | 2/2006 |
| EP | 1641147 A1 | 3/2006 |
| JP | 9130787 | 5/1997 |
| JP | 9214507 A | 8/1997 |
| JP | 10164533 A | 6/1998 |
| JP | 10322673 A | 12/1998 |
| JP | 10341217 A | 12/1998 |
| JP | 2001230809 | 8/2001 |
| JP | 2002016929 A | 1/2002 |
| JP | 2003244695 | 8/2003 |
| JP | 2004072720 A | 3/2004 |
| JP | 2004253883 | 9/2004 |
| JP | 2004350227 A | 12/2004 |
| JP | 2004364277 A | 12/2004 |
| JP | 2005192073 A | 7/2005 |
| JP | 2005236783 A | 9/2005 |
| JP | 2005286832 A | 10/2005 |
| KR | 20020081521 A | 10/2002 |
| KR | 1020060046281 | 5/2006 |
| RU | 2219671 | 12/2003 |
| RU | 2002130511 | 3/2004 |
| RU | 2295833 C2 | 3/2007 |
| WO | 0018130 | 3/2000 |
| WO | WO0180477 | 10/2001 |
| WO | WO03026316 | 3/2003 |
| WO | WO03077462 A1 | 9/2003 |
| WO | 2004056028 | 7/2004 |
| WO | WO2004056123 | 7/2004 |
| WO | 2004084503 | 9/2004 |
| WO | WO2004091130 A1 | 10/2004 |
| WO | WO2005004374 A2 | 1/2005 |
| WO | WO2005122025 A2 | 12/2005 |
| WO | 2007051156 | 5/2007 |
| WO | WO2007119086 | 10/2007 |

OTHER PUBLICATIONS

ITU-T H.263 "Series: H Audiovisual and Multimedia Systems Infrastructure of Audiovisual services-Coding of Moving video- Video Coding for Low Bit Rate Communication," (Jan. 2005).

RFC 2190 C. Zhu et al.: "RTP Payload Format for H.263 Video Streams," Network Working Group, pp. 1-12, Sep. 1997.

RFC 2429 C. Borman et al.; "RTP Payload Format for the 1998 Version of ITU-T Rec. H.263 Video (H.263+)," Network Working Group, pp. 1-17, Oct. 1998.

RFC 3016 Y. Kikuchi et al.: "RTP Payload Format for MPEG-4 Audio/Visual Streams," Network Working Group, pp. 1-21, Nov. 2000.

International Search Report—PCT/US2006/038107, International Search Authority—European Patent Office- Mar. 26, 2007.

Written Opinion—PCT/US2006/038107, International Search Authority—European Patent Office- Mar. 26, 2007.

International Preliminary Report on Patentability—PCT/US2006/038107, International Search Authority—The International Bureau of WIPO- Apr. 1, 2008.

"Video Codec Test Model, Near-Team Version8 (TMN8) Revision 1," ITU-T Telecommunication Standardization Sector of ITU, Geneva, CH, vol. Q15/16, Sep. 8, 1997, pp. I-III, 1, XP001074663.

Fidler M, "Real-Time Multimedia Streams in a Differentiated Services Network," Computer Communications and Networks, 2001. Proceedings Tenth International Conference on Oct. 15-17, 2001, Piscataway, NJ, USA, IEEE, pp. 380-385, XP010562121.

Hosein P et al: "Dynamic power headroom threshold for mobile rate determination in a CDMA network" Vehicular Technology Conference, 2004. VTC 2004-Spring. 2004 IEEE May 17-19, 2004, pp. 2404-2408, XP010766590.

Kalavakunta R et al: "Evolution of mobile broadband access technologies and services consideration and solutions for smooth migration from 2G to 3G networks" Personal Wireless Communications, 2005 IICPWC 2005. 2005 IEEE International Conference on Jan. 23-25, 2005, pp. 144-149, xp010799046.

Kamel I et al.: "A Study on Scheduling Multiple Priority Requests in Multimedia Servers," Multimedia Computing and Systems, 1999. IEEE International Conference on Florence, Italy Jun. 7-11, 1999, Los Alamitos, CA, USA, IEEE comput. Soc., US, vol. 2, Jun. 7, 1999, pp. 395-399, XP010519422.

Keller R et al.: "An Active Router Architecture for Multicast Video Distribution," Infocom 2000. Nineteenth Annual joint Conference on the IEEE Computer and Communications Societies. Proceedings IEEE Tel Aviv, Israel Mar. 26-30, 2000, Piscataway, NJ, USA, pp. 1137-1146.

Lakshman T et al.: "The Drop from Front Strategy in TCP and in TCP over ATM," Proceedings of IEEE Infocom 1996. Conference on Computer Communications. Fifteenth Annual Joint Conference on the IEEE Computer and Communications Societies. Networking the Next Generation, Mar. 24-28, 1996, vol. 3, conf. 15, pp. 1242-1250, XP000622260.

Meng-Huang Lee et al.: "A Predictable High-Throughput File System for Video Conference Recodring." Systems, Man and Cybernetics, 1995. Intelligent Sytmes for the 21st Century. IEEE International Conference on Vancouver, BC, Canada Oct. 22-25, 1995, New York, vol. 5, pp. 4296-4301, XP010195015.

Myeong-Jin Lee et al.: "Video Frame Rate Control for Non-Guaranteed Network Services with Explicit Rate Feedback," Proceedings of Global Telecommunications Conference, pp. 293-297, 2000, XP002427548.

Reininger D et al.: "VBR MPEG Video Coding with ynamic Bandwidth Renegotiation," Communications-Gateway to Globalization. Proceedings of the Conference on Communications. Seattle, Jun. 18-22, 1995, ICC, New York, IEEE, US, vol. 3, Jun. 18, 1995, pp. 1773-1777.

Zhihai HE et al.: "A Linear Source Model and a Unified Rate Control Algorithm for DCT Video Coding," Transactions on Circuits and Systems for Video Technology, IEEE Service Center, Piscataway, NJ, US, vol. 12, No. 11, Nov. 2002, pp. 970-982, XP011071890.

Zhihai HE et al.: "Optimum Bit Allocation and Accurate Rate Control for Video Coding via rho-Domain Source Modeling," IEEE Transactions on Circuits and Systems for Video Technology, IEEE Service Center, Piscataway, NJ, US, vol. 12, No. 10, Oct. 2002, pp. 840-849, XP011071878.

Text Description of Joint Model Reference Encoding Methods and Decoding Concealment Methods, Joint Video Team (JVT) of ISO/IEC MPEG and ITU-T VCEG Hong Kong, Jan 2005. Sections 2.1. 2.1.2, 2.1.3.1.1, 2.5, 3.1, 3.3.

"TIA/EIA/IS-856 CDMA2000 High Rate Packet Data Air Interface Specification," Apr. 2004.

3GPP TR 26.902 V1.0.0, "3RD Generation Partnership Project; Technical Specification Group Services and System Aspects; Video Codec Performance," (Release 7)(Mar. 2007).

3GPP TR 26.914, "Multimedia telphony over IP Multimedia Subsystem (IMS); Optimization opportunities" 2006.

3GPP TS 26.114 v1.2.0 (Dec. 13, 2006), "3rd Generation Partnership Project; Technical Specification Group Services and System Aspects-IP multimedia subsystem (IMS) multimedia telephony; media handling and interaction," (Release 7) TSG-SA4 internal working.

3GPP TS 34.108 v6.5.0, "3rd Generation Partnership Project; Technical Specification Group Radio Access Network Common test environment for UE conformance testing," (Release 6) (Dec. 2006).

3GPP2 C.R1008 v1.0, "cdma2000 Multimedia evaluation methodologies," Jan. 12, 2007.

3GPP2: "Packet Switched Video Telephony Services" 3GPP Dec. 2007, XP002542622 Retrieved from the Internet: URL:http://www.3gpp2.org/publi cjitml/specs /C.S0055-0_v1.0_071213.pdf> [retrieved on Aug. 24, 2009] p. 32, paragraph 8—p. 33.

D. Morikawa et al.: A feedback rate control of video stream in best-effort high-speed mobile packet network, The 5th Int. Symp. Wireless Personal Multimedia Comm., Oct. 27-30, 2002.

D. Singer et al., "A general mechanism for RTP Header Extensions," IETF Internet Draft (July 2008).

G.Cheung et al., "Video transport over wireless networks," IEEE Trans . Multimedia, Aug. 2005 , pp. 777-785.

H. Schulzrinne et al.,"RTP: A Transport Protocol for Real-Time Applications," IETF RFC 3550 (2003).

Hari Garudadri et al.: "Feedback Based Network Adaptive Source Coding for Packet Switched Multimedia Telephony," Qualcomm Inc.—PSVT: Feedback base rate control; version 0.6 May 26, Sep. 13, Sep. 19, 2006, pp. 1-9.

I. Johansson et al., "Support for non-compound RTCP in RTCP AVPF profile, opportunities and consequences," IETF Internet Draft (2007).

ISO/IEC 14496-2, International Standard, Information technology—Coding of audio—visual objects—Part 2: Visual, Third edition Jun. 1, 2004.

ITU-T H.263 "Series H: Audiovisual and Multimedia Systems Infrastructure of audiovisual service-Coding of moving video: Video coding for low bitrate communication," (Jan. 2005).

ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVLC parsing process.

"ITU-T Study Group 16, rate control for low-delay video communications," No. q15-A-20, 1997.

Kueh V Y H et al.: "Performance evaluation of SIP-based session establishment over satellite-UMTS" VTC 2003-Spring. The 57th IEEE Semiannual Vehicular Technology Conference Proceedings. Apr. 22-25, 2003, vol. 2, Apr. 22, 2003, pp. 1381-1385, XP010862.

Lee M et al: "Video Frame Rate Control for Non-Guaranteed Network Services With Explicit Rate Feedback" IEEE Telecommunication Conference, Nov. 27- Dec. 1, 2000; vol. 1, Nov. 27, 2000, pp. 293-297, XP001195580.

Lei Z et al.: "Adaptive video transcoding and streaming over wireless channels" Journal of Systems & Software, vol. 75, No. 3, Mar. 1, 2005, pp. 253-270, XP004656968.

Lu, X; et. al: "Understanding video quality and its use in feedback control" Packet Video 2002, Pittsburgh,PA USA 2002.

Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, Ch, Jul. 1, 2006, XP015055018 ISSN: 0000-0003 abstract p. 31, paragraph 6—p. 41.

Ruiz, P. et el.: "Adaptive Multimedia Applications to Improve Userperceived QoS in Multihop Wireless Al hoc Networks," Proceedings of the IEEE Int-rnation-1 Conference on Wireless Lane and Horne Networks (1CWLHN 2002) Online Aug. 2002, pp. 673-684, XP002466712; URL:htto://ants.dif.um ,estfoedrornipublications. htrni#2002 retrieved on Jan. 26, 2008).

Technical Specification Group Radio Access Network: "3GPP TR25. 848 V4.0.0 Physical Layer Aspects of UTRA High Speed Downlink Packet Access (Release 4)" 3GPP TR 25.848 V4.0.0, Mar. 2001, pp. 1-89, XP002189517.

T.V. Lakshman et al.: "Transporting compressed video over ATM networks with explicit-rate feedback control," IEEE Trans. Networking, Oct. 1999, vol. 7, No. 5, pp. 710-723.

T.V. Lakshman et al.: "VBR Video: Tradeoffs and Potentials", Proceeding of the IEEE, May 1998, vol. 86, No. 5, pp. 952-973.

"Universal Mobile Telecommunications System (UMTS); Radio Link Control (RLC) Protocol Specification (3GPP TS 25.322 version 6.9.0 Release 6); ETSI TS 125.322" ETSI Standards, LIS, vol. 3-R2, No. v6.9.0, Sep. 1, 2006, XP014035577.

Y.-G. Kim et al.: "TCP-frendly internet video with smooth and fast rate adaption and networks-aware error control," IEEE Trans. Circ. Sys. Vid. Tech., Feb. 2004, vol. 14, No. 2, pp. 256-268.

Harinath Garudadri et al.: "Rate Adaptation for Video Telephony in 3G Networks" Nov. 12-13, 2007, pp. 342-348.

Kang, K. et al.: "Dynamic Rate Control Mechanism for Large Scale Sessions," Twelfth International Conference on Information Networking Proceedings, 1998. (ICOIN-12). Tokyo, Japan, Jan. 21-23, 1998, (Jan. 21, 1998), pp. 21-24, XP010265270, ISBN: 978-0-8186-7225-5., doi: 10.1109/ICOIN.1998.648346.

Khansari, M. et al.: "Low Bit-Rate Video Transmission over Fading Channels for Wireless Microcellular Systems," IEEE Transactions on Circuits and Systems for Video Technology, IEEE Service Center, Piscataway, NJ, US, vol. 6, No. 1, (Feb 1, 1996), XP011014283, ISSN: 1051-8215.

Stockhammer, Thomas. "Progressive Video Transmission For Packet Lossy Channels Exploiting Feedback and Unequal Erasure Protection," International Conference on Image Processing (ICIP), vol. 2, (Sep. 22, 2002), pp. 169-172, XP010607935, ISBN: 978-0-7803-7622-9.

Translation of Korean Application 2008-7029470 corresponding to U.S. Appl. No. 11/445,099, citing KR2005-45667 (KR pub KR20060046281) dated Apr. 30, 2010.

Translation of Office Action in Chinese application 200680046647.1 corresponding to U.S. Appl. No. 11/454,475, citing US20030012212 and CN1293871 dated Mar. 17, 2011.

Translation of Office Action in Chinese Application 200680046657.5 corresponding to U.S. Appl. No. 11/315,399, citing US20030152032, CN1272271, WO2004056028, EP1170957 and EP1168732 dated Mar. 16, 2011.

Translation of Office Action in Japan application 2008-533677 corresponding to U.S. Appl. No. 11/240,133, citing JP10164533, JP10322673, JP2004072720, JP2004364277, JP2005236783, JP2004350227, U55541919 and US5341374 dated Feb. 1, 2011.

Ott Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, CH, Jul. 1, 2006, XP015055018 ISSN: 0000-0003 abstract p. 31, paragraph 6 - p. 41.

* cited by examiner

VIDEO PACKET SHAPING FOR VIDEO TELEPHONY

TECHNICAL FIELD

The disclosure relates to video telephony (VT) and, more particularly, techniques for assembling audio and video packets for transmission in a VT system.

BACKGROUND

Video telephony (VT) involves the real-time communication of packets carrying audio and video data. Each VT device includes a video encoder that obtains video from a video capture device, such as a video camera or video archive, and generates video packets. Similarly, an audio encoder in each VT device obtains audio from an audio capture device, such as a microphone or speech synthesizer, and generates audio packets. The video packets and audio packets are placed in a radio link protocol (RLP) queue. A medium access control (MAC) layer module generates medium access control (MAC) layer packets from the contents of the RLP queue. The MAC layer packets are converted to physical (PHY) layer packets for transmission across a communication channel to another VT device.

In mobile VT applications, a VT device receives the physical layer packets via a wireless forward link (FL) (or "downlink") from a base station to a wireless terminal. A VT device transmits the PHY layer packets via a wireless reverse link (RL) (or "uplink") from a wireless terminal to a base station. Each VT device includes PHY and MAC layers to convert the received PHY and MAC layer packets and reassemble the packet payloads into audio packets and video packets. A video decoder within the VT device decodes the video data for presentation to a user via a display device. An audio decoder within the VT device decodes the audio data for presentation via an audio speaker.

Mobile VT in a wireless environment can be challenging. The data rate over the wireless channel is limited and varies with time. For example, in a CDMA2000 1x EV-DO Release 0 network, the data rate may vary due to conditions within a wireless coverage area or traffic congestion among multiple VT users. In addition, when the data rate drops to zero, e.g., when there is no data to send, recovery to a reasonable data rate may require time. As a result, mobile VT can be susceptible to undesirable video and audio delay, which undermines the ability to carry on smooth video conferencing in real-time.

SUMMARY

In general, the disclosure is directed to techniques for video packet shaping for VT applications. The video packet shaping techniques can be used to prioritize audio packets to reduce audio delay. Channel conditions, excessive video content, or both can cause significant delays in transmission of audio packets. When reverse link (RL) throughput is reduced, video packet size can overwhelm the RL and increase audio delay. In particular, the video packet may fill the RLP queue and consume an excessive number of MAC layer packets, resulting in delays between successive transmissions of MAC layer packets carrying audio packets.

According to the disclosed techniques, the size of each video packet is adjusted so that audio packets are prioritized for transmission without substantial delay. In particular, the size of each video packet submitted to the RLP queue is controlled to ensure timely transmission of audio. For example, video packets may be sized so that each audio packet can be sent with the next available MAC layer packet taken from the RLP queue. In this manner, quality of service (QoS) can be provided for audio packets at the application layer.

The video packet size may be controlled based on estimated throughput of a channel, such as a wireless channel. The throughput may be estimated based on channel conditions, as represented by current wireless channel transmit rate, wireless base station activity, or transmit power limitations. The audio portion of a VT conference can be conveyed without substantial delay, even though the video portion may suffer from delay due to channel conditions. Although video may be compromised by channel conditions, video packet shaping ensures that the parties to the VT conference are still able to smoothly carry on a verbal conversation.

In addition, in some embodiments, the video packet shaping technique may further include adaptive source rate control based on video buffer occupancy. In this case, the source video encoding rate may be reduced if the channel conditions do not support the video encoding rate, given the need for prioritized audio packetization. The video encoding rate may be adjusted, for example, based on an amount of unpacketized video frame data residing in a video buffer.

In one embodiment, the disclosure provides a method comprising generating an audio packet, estimating throughput of a wireless channel, and generating a video packet with a video packet size determined based on the estimated throughput.

In another embodiment, the disclosure provides a system comprising an audio encoder that generates audio data, an audio buffer that receives the audio data and outputs an audio packet, a video encoder that generates video data, a packetizer that estimates throughput of a wireless channel, generates a video packet from the video data with a video packet size determined based on the estimated throughput.

In an additional embodiment, the disclosure provides a computer-readable medium comprising instructions to cause a processor to generate an audio packet, estimate throughput of a wireless channel, and generate a video packet with a video packet size determined based on the estimated throughput.

In some embodiments, the video packet size is determined based on the estimated throughput, a size of the audio packet, and a size of buffered data in an output queue containing the audio packet prior to placement of the video packet in the output queue. The video packet may be sized so that the audio packet can be placed in the next available MAC layer packet generated from the contents of the output queue.

The details of one or more embodiments are set forth in the accompanying drawings and the description below. Other features, objects, and advantages will be apparent from the description and drawings, and from the claims.

DETAILED DESCRIPTION

Figure 1:
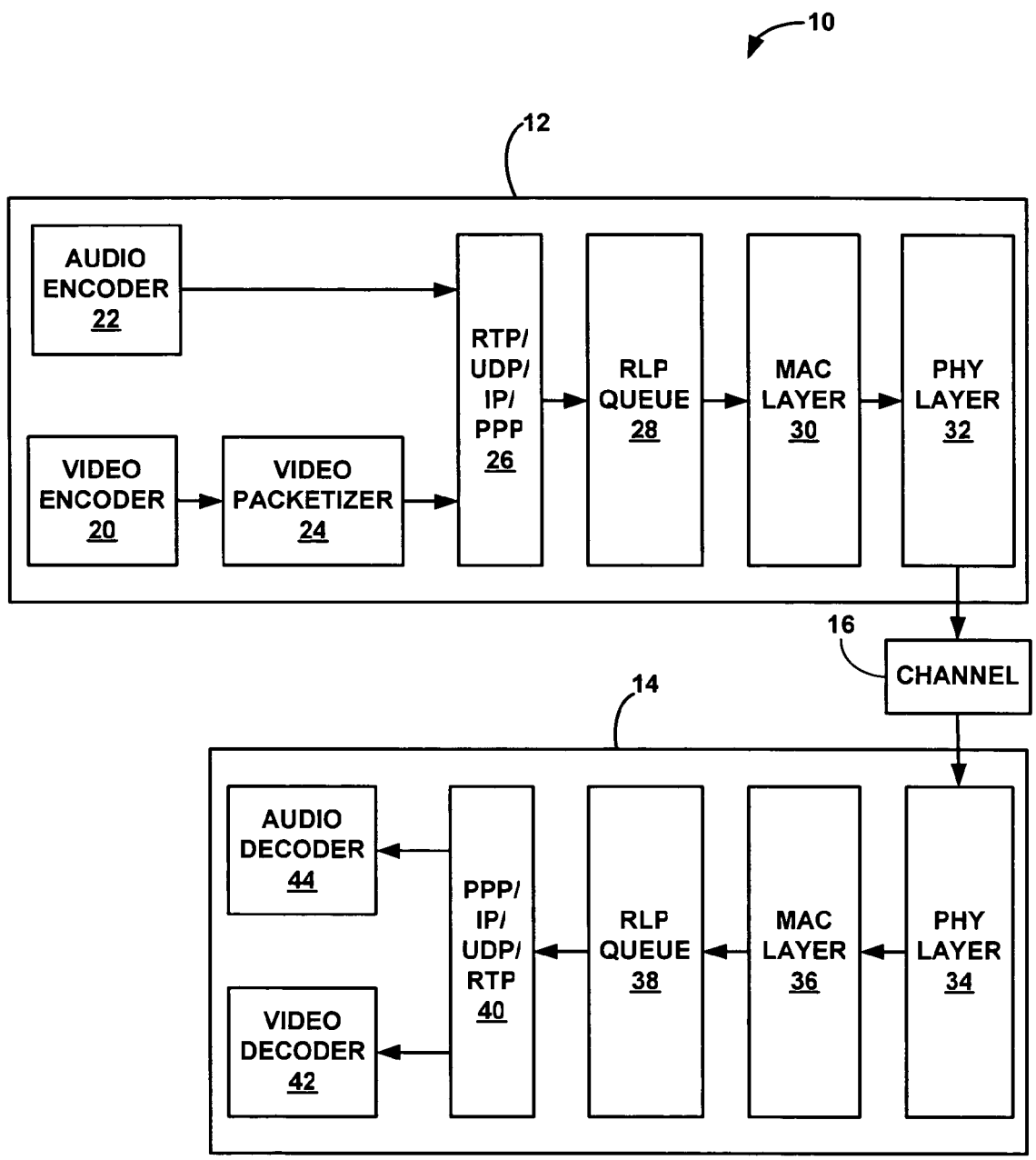
FIG. 1 is a block diagram illustrating a video/audio encoding and decoding system for VT applications.

FIG. 1 is a block diagram illustrating a video encoding and decoding system 10. As shown in FIG. 1, system 10 includes an encoder system 12 and a decoder system 14 connected by a transmission channel 16. Encoder system 12 is associated with a first video communication device and includes a video encoder 20, an audio encoder 22, a video packetizer 24, an real-time transport protocol (RTP)/user datagram protocol (UDP)/Internet protocol (IP)/point-to-point protocol (PPP) conversion module 26, an radio link protocol (RLP) queue 28, a MAC layer module 30 and a PHY layer module 32. Decoder system 14 is associated with another video communication device and includes a PHY layer module 34, MAC layer module 36, RLP queue 38, RTP/UDP/IP/PPP conversion module 40, a video decoder 42, and an audio decoder 44. As will be described, packetizer 24 performs video packet shaping based on channel conditions to prioritize audio packet transmission and thereby avoid excessive audio delays.

System 10 may provide bi-directional video and audio transmission, e.g., for video telephony via transmission channel 16. Accordingly, generally reciprocal encoding, decoding, and conversion modules may be provided on opposite ends of channel 16. In some embodiments, encoder system 12 and decoder system 14 may be embodied within video communication devices such as wireless mobile terminals equipped for video streaming, video telephony, or both. The mobile terminals may support VT according to packet-switched standards such as RTP, UDP, IP, or PPP. RTP/UDP/IP/PPP conversion module adds appropriate RTP/UDP/IP/PPP header data to audio and video data received from audio encoder 22 and video packetizer 24, and places the data in RLP queue 28. RTP runs on top of UDP, while UDP runs on top of IP, and IP runs on top of PPP. MAC layer module 30 generates MAC RLP packets from the contents of RLP queue 28. PHY layer module 30 converts the MAC RLP packets into PHY layer packets for transmission over channel 16.

PHY layer module 34 and MAC layer module 36 of decoding system 14 operate in a reciprocal manner. PHY layer module 34 converts PHY layer packets received from channel 16 to MAC RLP packets. MAC layer module 36 places the MAC RLP packets into RLP queue 38. RTP/UDP/IP/PPP conversion module 40 strips the header information from the data in RLP queue 38, and reassembles the video and audio data for delivery to video decoder 42 and audio decoder 44, respectively.

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. Typically, for VT applications, system 10 will be designed to support high data rate (HDR) technologies such as cdma2000 1x EV-DO Release 0.

Video encoder 20 generates encoded video data according to a video compression method, such as MPEG-4. Other video compression methods may be used, such as the International Telecommunication Union (ITU) H.263, ITU H.264, or MPEG-2 methods. Audio encoder 22 encodes audio data to accompany the video data. The video may be obtained from a video capture device, such as a video camera, or from a video archive. The audio data may be encoded according to an audio compression method, such as adaptive multi-rate narrow band (AMR-NB), or other techniques. The audio may be obtained from an audio capture device, such as a microphone, or from a speech synthesizer device. For VT applications, the video will permit viewing of a party to a VT conference and the audio will permit the speaking voice of that party to be heard.

In operation, RTP/UDP/IP/PPP conversion module 26 obtains video and audio data packets from video encoder 20 and audio encoder 22. RTP/UDP/IP/PPP conversion module 26 adds appropriate header information to the audio packets and inserts the resulting data within RLP queue 28. Likewise, RTP/UDP/IP/PPP conversion module 26 adds appropriate header information to the video packets and inserts the resulting data within RLP queue 28. MAC layer module 30 retrieves data from RLP queue 28 and forms MAC layer packets. Each MAC layer packet carries RTP/UDP/IP/PPP header information and audio or video packet data that is contained within RLP queue 28.

Audio packets are inserted into RLP queue 28 independently of video packets. However, packetizer 24 controls the sizes of video packets added to RLP queue 28 so that each audio packet can be carried by the next available MAC layer packet. In some cases, a MAC layer packet generated from the contents of RLP queue 28 will carry only header information and video packet data. In other cases, the MAC layer packet will carry only header information and audio packet data. In many cases, the MAC layer packet will carry header information, audio packet data and video packet data, depending on the contents of RLP queue 28. The MAC layer packets may be configured according to a radio link protocol (RLP), and may be referred to as MAC RLP packets. PHY layer module 32 may include converts the MAC RLP audio-video packets into PHY layer packets for transmission across channel 16.

Channel 16 carries the PHY layer packets to decoder system 14. Channel 16 may be any physical connection between encoder system 12 and decoder system 14. For example, channel 16 may be a wired connection, such as a local or wide-area wired network. Alternatively, as described herein, channel 16 may be a wireless connection such as a cellular, satellite or optical connection. Channel condition may be a concern for wired and wireless channels, but is especially problematic for mobile VT applications performed over a wireless channel 16.

In accordance with this disclosure, video packetizer 24 controls the size of each video packet provided to RTP/UDP/IP/PPP conversion module 26 in order to prioritize transmission of audio. In particular, video packets are sized so that each packet can be accommodated by the next available MAC layer packet. Controlled sizing of video packets prevents audio delays caused by channel conditions, large video packets, or both. When an audio packet is available, it is placed in the RLP queue for inclusion in the next available MAC RLP packet generated by MAC layer module 30. The audio packet may be combined with a video packet that has been sized to permit space for placement of the audio packet within the MAC RLP packet.

Video packetizer 24 is configured to be channel-adaptive in the sense that it is capable of adjusting video packet size based on channel conditions. In this manner, encoder system 12 can prioritize transmission of audio packets to avoid audio delays when channel conditions are poor. At the same time, video packetizer 24 can ensure that audio prioritization does not result in video packets being under-packetized. In other words, video packetizer 24 sizes video packets sufficiently small to permit inclusion of one or more audio packets in the next available MAC RLP packet, but not so small that excessive space in the MAC RLP packet is wasted. Consequently, video packetizer 24 may support both prioritization of audio packets and efficient transmission of video packets.

PHY layer module 34 of decoder system 14 identifies the MAC layer packets from the PHY layer packets and reassembles the content into MAC RLP packets. MAC layer module 36 then reassembles the contents of the MAC RLP packets to provide video and audio packets for insertion within RLP queue 38. RTP/UDP/P/PPP module 40 strips out the accompanying header information and provides video packets to video decoder 42 and audio packets to audio decoder 44. Video decoder 42 decodes the video data frames to produce a stream of video data for use in driving a display device. Audio decoder 44 decodes the audio data to produce audio information for presentation to a user, e.g., via an audio speaker.

As discussed above, video packetizer 24 is provided to control the size of video packets submitted to RTP/UIDP/IP/PPP conversion module 26. Video packetizer 24 controls the size of video packets to prioritize transmission of audio packets in MAC RLP packets, and prevent video packets from overwhelming RLP queue 28. In this manner, the audio portion of a VT conference can be conveyed without substantial delay, even though the video portion may suffer from delay due to channel conditions. Although video may be compromised by channel conditions, video packetizer 24 ensures that the parties to the VT conference are still able to smoothly carry on a verbal conversation.

The packet shaping technique applied by video packetizer 24 may apply one or more rules to ensure prioritized transmission of audio packets. According to one rule, for example, an audio packet should be sent in the very next available MAC RLP packet generated from the contents of RLP queue 28. Audio frames are generated by audio encoder 22 at first periodic intervals. MAC RLP packets are generated by MAC layer module 30 at second periodic intervals. The audio frame generated at a given interval should be placed in the next available MAC RLP packet generated by MAC layer module 30. In some embodiments, as an option, the total output queue size of RLP queue 28 along with the audio packet size should be able to be carried in one MAC RLP packet.

Various rules may be applied with respect to every packet of a VT sequence. Although some video packets may be inherently sized in a manner that ensures that audio and video can be carried in a single MAC RLP packet, others video packets may be larger and require size reduction in order to ensure that audio and video can be carried in a MAC RLP packet, particularly when channel conditions degrade. By applying the techniques with respect to every packet of a VT sequence, satisfactory speech communication can be ensured even if the content of the video is expansive or channel bandwidth is substantially limited.

The size of each video packet submitted to RTP/UDP/IP/PPP conversion module 26 by packetizer 24 for insertion in RLP queue 28 is controlled. The above rule ensures that audio packets are not delayed due to consumption of successive MAC RLP packets by expansive video content. Instead, when audio is available, video from video encoder 20 is divided into packets with sizes selected to permit each MAC RLP packet to carry audio and video. Each audio frame may be used as the audio packet provided to RLP queue 28. Alternatively, in some embodiments, an audio packet may bundle multiple audio frames provided at successive intervals.

Video packetizer 24 may determine the video packet size for each MAC layer packet, in some embodiments, based on an estimated channel throughput for the MAC layer packets generated between successive audio frames. The throughput may be estimated based on channel conditions, as represented by one or more of current wireless channel transmit rate, wireless base station activity, and transmit power limitations. For example, the channel conditions may be determined based on current MAC layer data rate, a reverse activity (RA) bit, and a power amplifier (PA) limit. In addition, in some embodiments, video encoder 20 may further include adaptive source rate control based on video buffer occupancy. In this case, the source video encoding rate may be reduced by video encoder 20 if the channel conditions do not support the video encoding rate, given the need for prioritized audio packetization.

Figure 2:
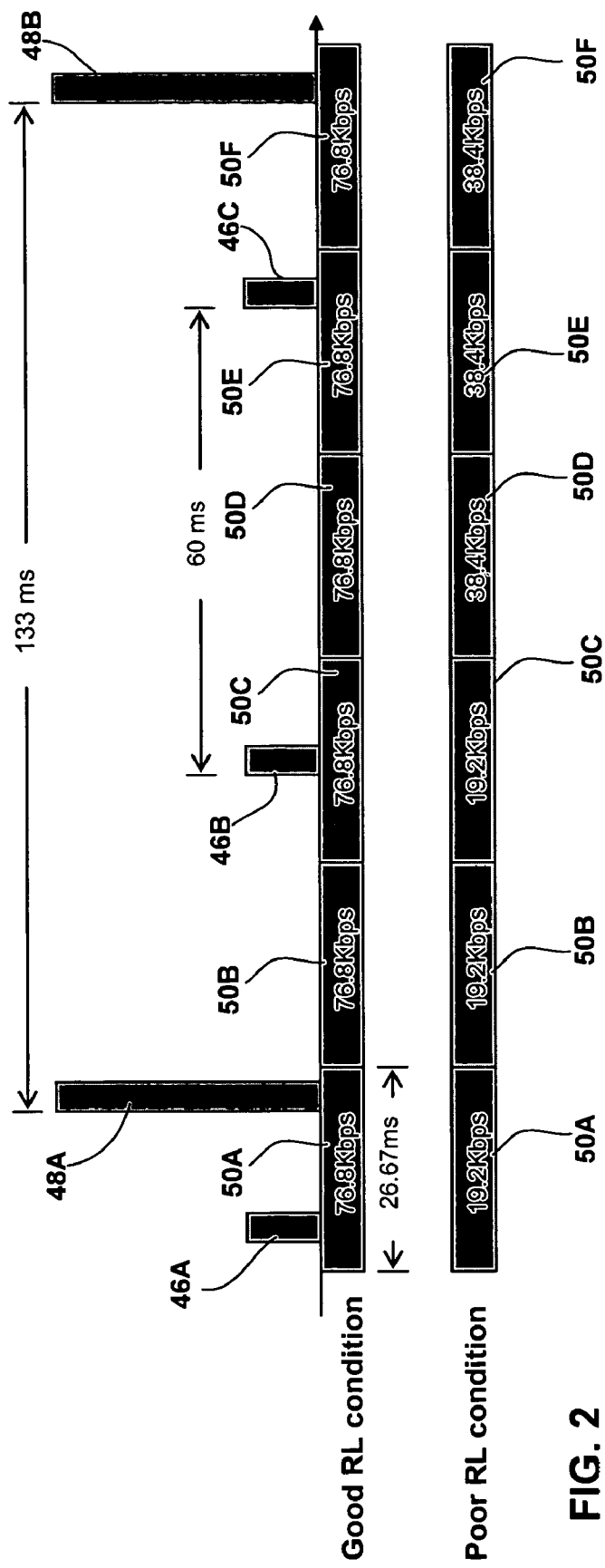
FIG. 2 is a diagram illustrating audio delays due to excessive video content, poor channel conditions, or both.

FIG. 2 is a diagram illustrating audio delays due to excessive video content or poor channel conditions. As shown in FIG. 2, audio encoder 22 generates audio frames 46A, 46B, 46C (collectively frames 46), and video encoder 20 generates video frames 48A, 48B, 48C (collectively frames 48). A series of successive MAC RLP packets 50A-50F (collectively MAC RLP packets 50) are available to carry audio packets and video packets derived from frames 46 and 48, which are buffered in RLP queue 28. Following generation of a first audio frame 46A by audio encoder 22, the next available MAC RLP packet generated by MAC layer module 30 is packet 50B. Packet 50C also can be used to carry first audio frame 46A. if necessary. If the contents of RLP queue 28 is overwhelmed by video packets, however, audio frame 46A may not be delivered for a long period of time.

Each MAC RLP packet 50 has an associated data rate derived from RL channel condition information. Under good RL conditions, each MAC RLP packet 50 carries a data rate of 76.8 Kilobits per second (Kbps). Under poor RL channel conditions, however, data rate fluctuates and is often low, e.g., 19.2 Kbps or 38.4 Kbps. Excessive video content, poor channel conditions, or both can cause significant delays in transmission of audio packets. Excessive video packet size can overwhelm the RL and increase audio delay, particularly when RL throughput is reduced due to low data rates.

A video packet, if left uncontrolled, may consume an excessive amount of the MAC RLP packet space, resulting in delays between successive transmissions of audio packets. In some cases, video may consume several consecutive MAC RLP packets 50, preventing audio from being transmitted promptly. Each MAC RLP packet 50 provides roughly 26.67 ms of space for incorporation of audio and video packet information. In the example of FIG. 2, a large video frame 48A is generated at substantially the same time as an audio frame 46A. In this scenario, successive video frames 48A, 48B are generated 133 ms from one another in time. However, audio frames 46B, 46C are generated only 60 ms from one another in time.

Even under good RL conditions, there may be insufficient space for incorporation of audio packets for audio frame 46A, as well as for audio frames 46B and 46C. Instead, video packets associated with video frame 48A may consume most of MAC RLP packets 50B-50F, resulting in significant audio delays. This problem is especially challenging when channel condition degrades, as indicated in the case of Poor RL condition shown in FIG. 2. To alleviate audio delays under a variety of channel conditions, system 10 of FIG. 1 incorporates video packetizer 24, which controls the size of video packets derived from video frames 36. By applying video limits with respect to every packet of a VT sequence, video packetizer 24 can ensure that the audio associated with the VT sequence is not compromised.

Figure 3:
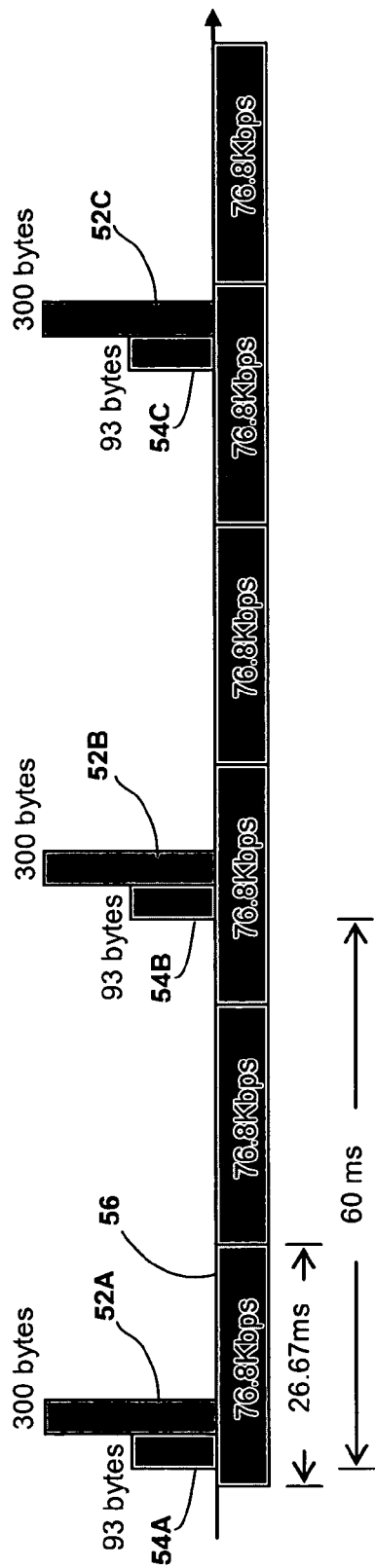
FIG. 3 is a diagram illustrating a technique for fixed length video packet shaping.

FIG. 3 is a diagram illustrating a technique for fixed length video packet shaping. Fixed length video packet shaping presents a partial solution to the problem of audio delay. However, fixed length video packet shaping does not consider channel conditions. Consequently, video can still overwhelm the channel when RL throughput is reduced. In addition, fixed length packet shaping does not consider the throughput between two successive audio packets, resulting in over- or under-packetization of video data.

In the example of FIG. 3, the size of video packets is controlled by fragmenting video frames into fixed size 300-byte packets 52A, 52B, 52C (collectively video packets 52) every 60 ms. Audio frames are fragmented into fixed-size 93 byte packets 54A, 54B, 54C (collectively audio packets 54) every 60 ms. Video packets 52 are transmitted immediately after audio data packets 54 within MAC RLP packets 56. Under normal operating conditions, fixed length video packetization promotes the timely transmission of audio packets 54 within MAC RLP packets 56.

The approach illustrated in FIG. 3 ensures that audio packets are transmitted without delay under good RL conditions. If RL conditions degrade, however, the fixed 300-byte video packets 52 can overwhelm the RL, resulting in delays between successive audio packets 54. Due to the fixed length of video packets 52, there is no ability to react to changes in RL conditions. In some instances, under good RL conditions, the video data may be underpacketized, resulting in underutilization of the space provided by each MAC RLP packet 56, and general bandwidth inefficiency. Under poor RL conditions, the fixed size of the video packet 52 may be too large for the RL to handle, resulting in audio delay. For this reason, this disclosure proposes adjustable length video packets, which have sizes that are adaptable in response to video content or bandwidth in order to maintain quality audio for an entire VT sequence.

Figure 4:
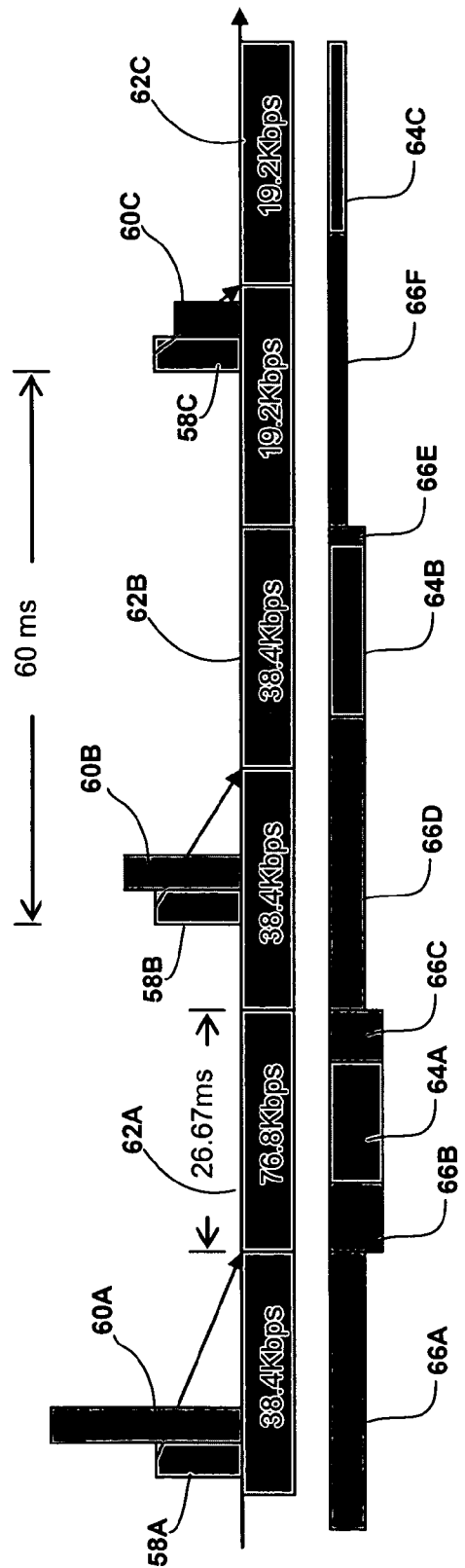
FIG. 4 is a diagram illustrating a technique for channel-adaptive video packet shaping.

FIG. 4 is a diagram illustrating a technique for channel-adaptive video packet shaping. In the example of FIG. 4, video packet size is adjusted based on channel conditions so that audio packets can be transmitted without substantial delay. Instead of a fixed video packet size, the size of each video packet is dynamically adjusted based on the size of audio packets and channel conditions. Under good RL conditions, video packet size may be increased, but not to the point that the video packets would overwhelm the RL and introduce audio delay. Under poor RL conditions, video packets are reduced in size to provide room for an audio frame to be packetized and placed in the next available MAC RLP packet.

As shown in FIG. 4, when audio frames 58A, 58B, 58C (collectively audio frames 58) are available, video frames 60A, 60B, 60C (collectively video frames 48) are sized so that the respective audio frame can be placed in the next available MAC RLP packet 62A, 62B, 62C (collectively MAC RLP packets 62). As indicated by the arrows in FIG. 4, each audio frame 58 is packetized and then placed in RLP queue 28 for inclusion in the next available MAC RLP packet generated by MAC layer module 30, eliminating excessive delay between transmission of audio packets. Reference numerals 64A, 64B, 64C (collectively 64) represent the audio packets placed within respective MAC RLP packets 62, along with video packet data. Reference numerals 66A-66F (collectively 66) represent the video packets placed within respective MAC RLP packets 62, with or without an audio packet. As shown in FIG. 4, each MAC RLP packet 62 may carry only audio, only video, or both audio and video, depending on the contents of RLP queue 28. However, at each audio packet interval, a video packet 62 is sized to permit incorporation of the audio packet 64 in the next available MAC RLP packet 62.

Notably, as the available RL rate is reduced, e.g., due to channel conditions, the size of the audio packet 58 increases relative to the size of the MAC RLP packet 62. In other words, each audio packet 58 consumes a greater proportion of the MAC RLP packet 62 as RL rate decreases because video packet size is reduced. Conversely, the size of each video packet 60 is dynamically adjusted so that it consumes a smaller proportion of the MAC RLP packet 62 as RL rate decreases. In this way, video packets 60 are sized to permit placement of each audio packet 58 within the next available MAC RLP packet 62. The result is that audio is given higher priority than video to reduce audio delay.

Figure 5:
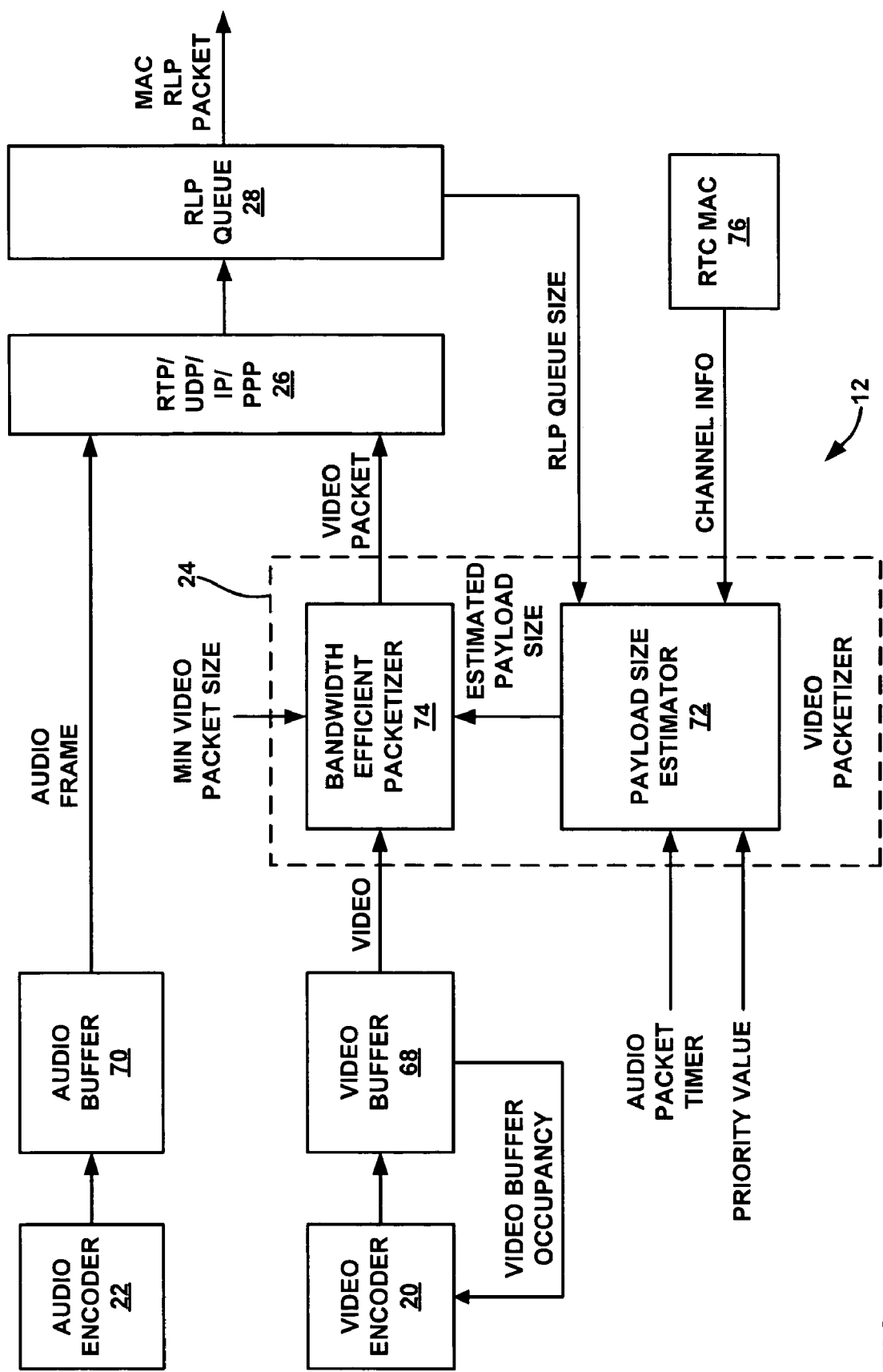
FIG. 5 is a block diagram illustrating a video/audio encoding system implementing a channel-adaptive video packet shaping technique.

FIG. 5 is a block diagram illustrating a video/audio encoding system 12 implementing a channel-adaptive video packet shaping technique in accordance with an embodiment of this disclosure. As shown in FIG. 5, encoding system 12 includes video encoder 20, audio encoder 22, video buffer 68, audio buffer 70, video packetizer 24, including payload size estimator 72 and bandwidth efficient packetizer 74, RTP/UDP/IP/PPP conversion module 26, RLP queue 28 and reverse traffic channel (RTC) MAC unit 76. RTC MAC unit 76 implements an RTC MAC protocol 314 to provide the procedures followed by a communication device to transmit over the RL. For convenience, MAC layer module 30 and PHY layer module 32 are not shown in FIG. 5. As will be described, payload size estimator 72 controls the size of each video packet based on one or more inputs. The inputs may relate to channel conditions, RLP queue characteristics, and audio packet size and status. Bandwidth efficient packetizer 74 generates video packets based on an estimated payload size specified by payload size estimator 72, subject to a minimum video packet size.

Video buffer 68 buffers video information received from video encoder 20, and passes the video information to video packetizer 24. Audio buffer 70 buffers audio frame information received from audio encoder 22 and passes the information to RTP/UDP/IP/PPP conversion module 26. Audio and video packets are inserted in RLP queue 29 independently of one another. The size of the video packets produced by video packetizer 24 ensures that there will be sufficient space for the audio packet in the next available MAC RLP packet produced by MAC layer module 30 (not shown in FIG. 5). In particular, RLP queue 28 is not overwhelmed with video packets, ensuring that the audio packet in the RLP queue can be sent with the next MAC RLP packet.

In the example of FIG. 5, payload size estimator 72 receives several inputs, including an audio packet timer, an audio priority value MACPredNumberPlus, RLP queue size, and channel information. The audio packet timer indicates whether audio information is presently available in audio buffer 70 and, if so, the timing at which each audio frame will be delivered. If audio frames are delivered at intervals of every 20 ms, for example, the audio packet timer will be set to 20 ms when audio frames are available. In some embodiments, audio buffer 70 may be configured to bundle successive audio frames for incorporation in a single IP packet. In this case, the audio packet timer may be a multiple corresponding to the number of frames bundled into the audio packet. In other words, the audio packet timer may have a value that is proportional or otherwise related to the number of bundled frames. If three audio frames are bundled, for example, the audio timer may be set to 60 ms. Hence, the audio packet timer also indicates the size of the audio packet generated by audio buffer 70 for insertion in RLP queue 28 via RTP/UDP/IP/PPP module 26.

The audio priority value MACPredNumberPlus defines the relative priorities of audio and video, and hence influences the delays associated with audio and video. For example, MACPredNumberPlus is established such that the smaller the priority value, the lower the audio delay. Accordingly, as MACPredNumberPlus increases, audio delay increases and video delay decreases. Conversely, as the MACPredNumberPlus decreases, audio delay decreases and video delay increases. Hence, audio delay tracks the audio priority value MACPredNumberPlus. Payload size estimator 72 uses the MACPredNumberPlus value to control the size of each video packet, resulting in a prescribed audio packet delay, as will be described in greater detail below.

The RLP queue size received by payload size estimator 72 represents the size of the current data buffered in RLP queue 28. Payload size estimator 72 uses the RLP queue size to control the size of the video packets. If RLP queue 28 is relatively full, payload size estimator 72 may adjust the size of the video packets downward to avoid overwhelming the RL and causing excessive audio delay. If RLP queue 28 is less full, payload size estimator 72 may increase the size of the video packets while still providing sufficient space for audio packets. With RLP queue size, payload size estimator 72 is able to dynamically adjust video packet size as a function of the fullness of RLP queue 28. Queue fullness may indicate excessive video content, degradation of channel conditions, or both. The use of RLP queue size is one of the ways in which payload size estimator 72 can react to overloading of video content or changes in channel conditions.

Payload size estimator 72 also may react more directly to changes in channel conditions by monitoring channel information provided by RTC MAC unit 76. RTC MAC unit 76 generates information relating to channel characteristics, such as current MAC RL rate, combined RA bit, and headroom limitation. The MAC RL rate indicates the current transmission rate available over the RL. The RA bit is the reverse activity bit, which indicates whether the pertinent wireless base station is busy. The headroom limitation may indicate the maximum rate that is allowed to be used in transmission, based on the current transmit power. The RA bit indicates when the RL is congested or unavailable due to base station inactivity. The PA limit represents transmit power headroom and indicates when channel conditions have degraded.

Based on the various inputs, payload size estimator 72 generates a payload size estimate. The payload size estimate is selected to permit an audio packet to be included in the next available MAC RLP packet, if the MACPredNumPlus priority value specifies that audio is to be accorded high priority. Bandwidth efficient packetizer 74 receives video from video buffer 68 and packetizes the video based on the payload size estimation specified by payload size estimator 72 and a minimum video packet size. The minimum video packet size represents the minimum size of video packets to be produced by packetizer 24. In effect, minimum video packet size controls the granularity of video packet size and bandwidth efficiency. For smaller minimum video packet size values, video packet shaping is more effective in terms of accommodating audio and thereby avoiding audio delays, but less bandwidth efficient. For larger minimum video packet size values, video packet shaping is less effective in avoiding audio delays, but provides greater bandwidth efficiency.

As further shown in FIG. 5, video encoder 20 may be configured to respond to a video buffer occupancy value from video buffer 68. In particular, in some embodiments, video encoder 20 provides an adaptive source rate control feature based on video buffer occupancy. When the video buffer 68 is relatively full, video encoder 20 responds by reducing the video encoding rate. When the video buffer 68 is less full, video encoder 20 increases the source video encoding rate. In this manner, the video encoding rate is reduced if channel conditions cannot support the current video encoding rate. This adaptive source rate control feature is optional, but may be desirable in some applications.

Additional implementation details will be described for purposes of illustration. Such details should considered exemplary, and not limiting of the techniques broadly embodied and described in this disclosure. For a cdma2000 1x EV-DO Rel. 0 implementation, RL throughput can be estimated based on channel conditions. 3GPP2 Specification C.S0024-A (also referred to as TIA IS-856-A), at page 11-143, Table 11.9.6.1 specifies minimum and maximum payload sizes in bytes for a MAC RLP packet given different channel conditions expressed in terms of transmission rate in Kbps. Table 11.9.6.1 is reproduced below:

TABLE

| Transmission Rate (Kbps) | Minimum Payload Size (bytes) | Maximum Payload Size (bytes) |
| --- | --- | --- |
| 9.6 Kbps | 1 | 29 |
| 19.2 Kbps | 30 | 61 |
| 38.4 Kbps | 62 | 125 |
| 76.8 Kbps | 126 | 253 |
| 153.6 Kbps | 254 | 509 |

If each transmission level in the above table is expressed as an index value, then the maximum payload size of each MAC RLP packet, including both audio and video, is as follows:

$$\text{Maximum payload size} = 2^{index+4} - 3.$$

For the above expression, index values 1, 2, 3, 4, and 5 are assigned to transmission rate levels of 9.6, 19.2, 38.4, 76.8 and 153.6 Kbps, respectively.

Figure 6:
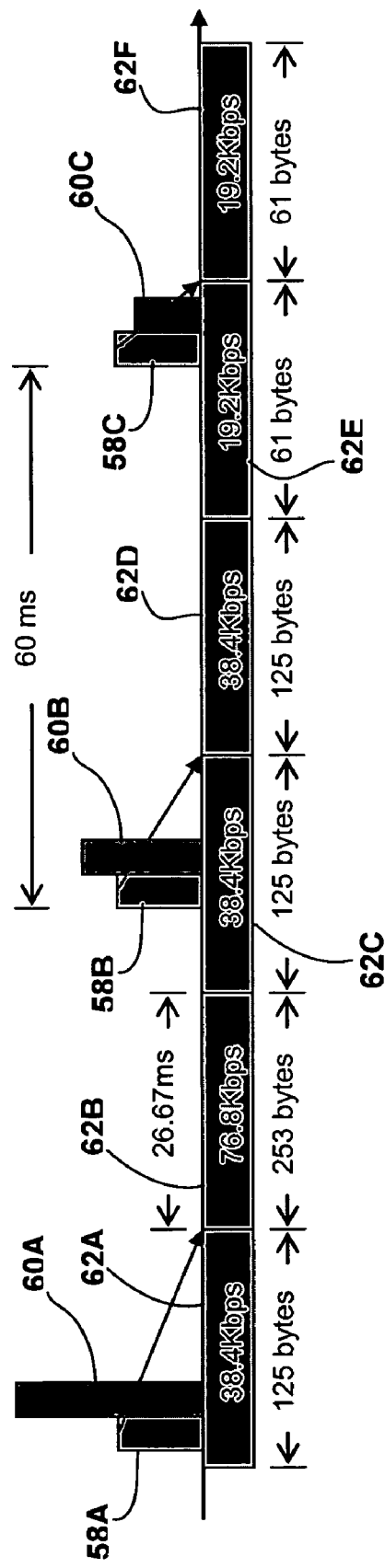
FIG. 6 is a diagram illustrating channel-adaptive video packet shaping over a range of channel conditions.

FIG. 6 is a diagram illustrating channel-adaptive video packet shaping over a range of channel conditions. As shown in FIG. 6, audio frames 58A, 58B, 58C (collectively audio frames 58) and video frames 60A, 60B, 60C (collectively video frames 60). MAC RLP packets 62A-62F (collectively MAC RLP packets 62) each have an associated RL transmission rate, and are capable of carrying different maximum payload sizes corresponding to those transmission rates. For example, MAC RLP packets 62A, 62C, and 62D have RL transmission rates of 38.4 Kbps and are each capable of carrying a maximum payload size of 125 bytes. MAC RLP packet 62B has an RL transmission rate of 76.8 Kbps and is capable of carrying a maximum payload size of 253 bytes. MAC RLP packets 62E and 62F have RL transmission rates of 19.2 Kbps and are each capable of carrying a maximum payload size of 61 bytes.

In an exemplary embodiment, the operation of payload size estimator 72 can be expressed as an algorithm in pseudo code. The algorithm relies on the following inputs: RA Bit, PA Limit, RL Rate, RLPQueueSize, AudioPacketSize, and MACPredNumberPlus. These inputs are also shown in FIG. 5. AudioPacketSize may be derived from the audio packet timer applied to payload size estimator 72. As mentioned previously, the combined RAbit is the reverse activity bit indicating the status of base station activity, PA Limit represents the transmit power headroom limitation imposed by power requirements and indicates when channel conditions have degraded, RL rate is the transmission rate of the RL, RLPQueueSize indicates fullness of RLP queue 28, and AudioPacketSize indicates the size of the current audio packet, i.e., the audio packet to be added to the next available MAC RLP packet. MACPredNumberPlus indicates the relative priority to be accorded to audio packets versus video packets. The output of the algorithm is VideoPayloadSize.

For initialization of the algorithm, the value MACPred-Number is set as follows:

MACPredNumber=floor((AudioFramesBundled* AudioFrameInterval)/26.67)+1+ MACPredNumberPlus MacPredNumber represents the number of MAC RLP packets necessary to carry a packet containing a single audio frame or set of bundled audio frames. AudioFrameInterval represents the time interval between audio frames. The value 26.67 is the time allocated for each MAC RLP packet. Hence, if three audio frames are bundled and the audio frame interval is 20 ms, and MACPredNumberPlus is zero, indicating high audio priority, then MACPredNumber is 3. This means that the predicted number of MAC RLP packets for which video payload size will be estimated is 3.

For every bundled audio packet, after sending the bundled audio packets, payload size estimator 72 makes a MAC audio throughput determination. The MAC throughput determination may proceed as indicated by the following pseudo code:

```
MACThroughput = 0;
MACRateIncrease = 1 - RABit;
MACPredRate = CurRate;
for (i = 0; i < MACPredNumber; i++)
{
    MACPredRate = MIN(MIN(MACPredRate + MACRateIncrease,
4),           PALimit);
    MACThroughput += (2^{MACPredRate+4}-3);
}
```

In the above MAC throughput determination, MACThroughput is the required throughput value for audio transmission, MACRateIncrease indicates whether the MAC RL rate will be increased based on reverse activity, CurRate is the current MAC RL rate, MACPredRate is the amount of increase in the MAC RL rate, expressed as an index value. As indicated above, MACThroughput is the maximum payload size available for each of the three predicted MAC RLP packets.

Given the maximum payload size MACThroughput for each MAC RLP packet, video payload size estimator 72 estimates the maximum video payload size (VideoPayloadSize) as follows:

VideoPayloadSize=MAX(MACThroughput— RLPQueueSize, 0)

VideoPayloadSize=MAX(VideoPayloadSize— 2*AudioPacketSize—45, 0), where RLPQueueSize indicates the fullness of RLP queue 28 and AudioPacketSize represents the size of the audio packet to be added to the next MAC RLP packet. The value 45 is a fixed number in bytes to account for RTP/UDP/IP/PPP overhead of header information introduced by RTP/UDP/IP/PPP conversion module 26. The value of this fixed overhead number could be different in other implementations.

Figure 7:
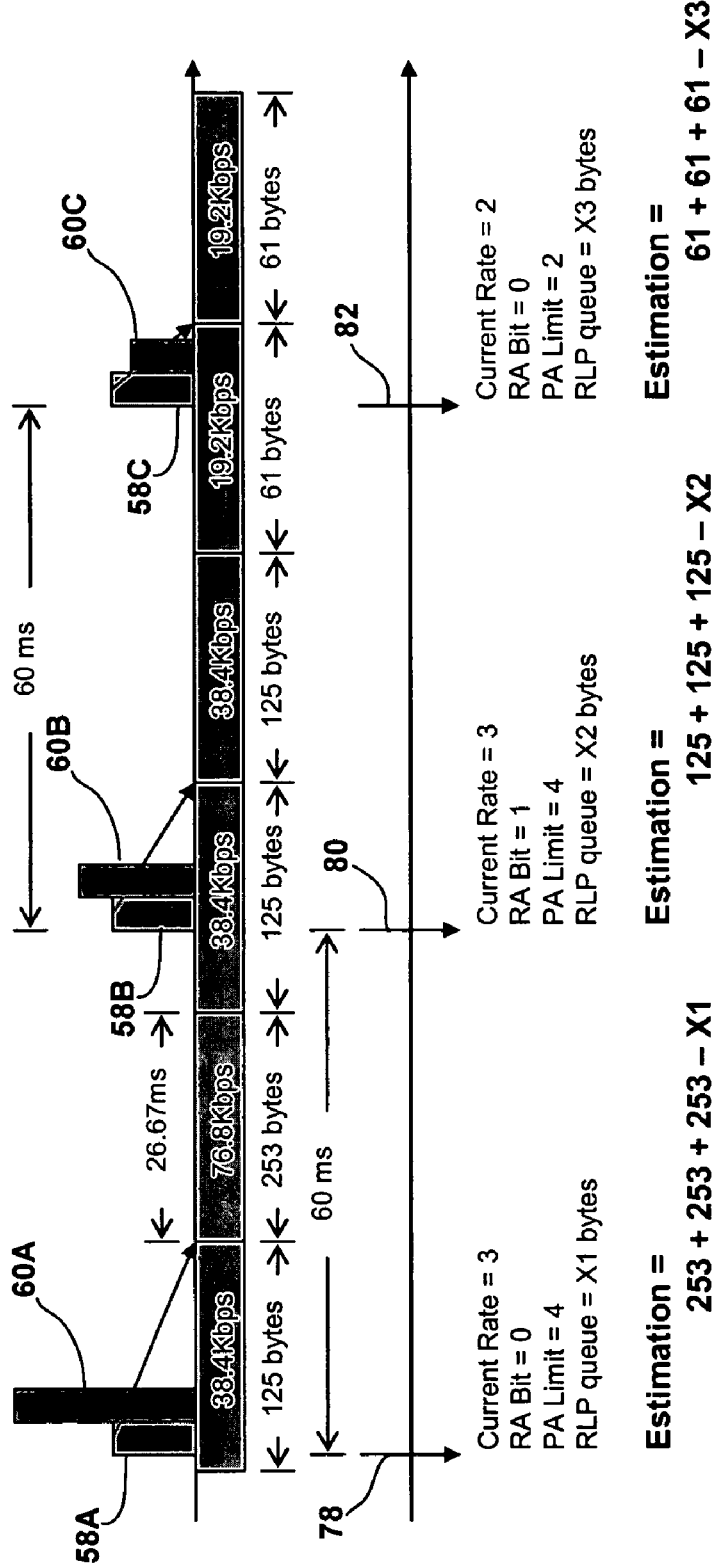
FIG. 7 is a diagram illustrating channel-adaptive video packet shaping over a range of channel conditions in greater detail.

FIG. 7 is a diagram illustrating channel-adaptive video packet shaping over a range of channel conditions in greater detail. Payload size estimator 72 adapts to the changing channel conditions, as represented in part by RL transmission rate, to adjust the size of the video packet payload presented for incorporation in the MAC RLP packets generated by MAC layer module 30 from the contents of RLP queue 28. In the example of FIG. 7, audio frames are generated at an interval of 60 ms. In this case, a decision is made every 60 ms concerning the available payload size in the next three MAC RLP packets.

At a first decision point 78, as shown in FIG. 7, the current MAC RL rate is indexed at 3 to represent 38.4 Kbps, the RA bit is set at zero, the PA limit is equal to 4 and the RLP queue contains X1 bytes. In this case, according to the above formulas, the throughput for each of the next three MAC RLP packets is estimated to be 253 bytes. Accordingly, the overall throughput over the next three MAC RLP packets is 253+253+253 bytes minus the contents X1 already placed in RLP queue 28. Hence, the MACThroughput value at the first decision point 50 is 253+253+253−X1 bytes.

At the second decision point 80, 60 ms later, the current RL rate is again indexed at 3 and the PA limit is 4, but the RA bit is set to 1 instead of 0. In this case, the RA bit indicates that the base station is busy and results in a prediction of a reduced throughput over the next three MAC RLP packets. In particular, the estimated throughput MACThroughput is 125+125+125−X2 bytes, where X2 represents the contents of RLP queue 28 at the time of the second decision point 80.

At the third decision point 82, 60 ms after the second decision point 78, the RA bit is 0, but the RL rate has dropped to an index value of 2 (19.2 Kbps) and the PA limit has dropped to an index value of 2. Consequently, the overall throughput MACThroughput over the next three MAC RLP packets decreases to 61+61+61−X3 bytes, where X3 represents the contents of RLP queue 28 at the time of the third decision point 82.

When MACThroughput is reduced, the space available for video packets is also reduced as a result of prioritization of the audio packets. In this case, payload size estimator 72 reduces the estimated size of the video payload for packetization. When MACThroughput increases, however, payload size estimator 72 responds by increasing the estimated video payload size. In this manner, video packetizer 24 not only prioritizes audio packets, but also supports bandwidth-efficient video packetization.

In the example of FIG. 7, decisions are made for three MAC RLP packets at a time. In other embodiments, however, a more aggressive decision process may be applied. For example, a decision for estimation of MACThroughput may be made every 20 ms. In a first 20 ms interval, a decision may be made for three MAC RLP packets. Then, in a second 20 ms interval, a decision may be made for the remaining two MAC RLP packets in a set of three successive MAC RLP packets. Finally, a decision may be made for the last MAC RLP packet in the three-packet set during the next 20 ms interval. In this case, decisions are made over the course of a 60 ms interval and updated every 20 ms for any changes that may have occurred in channel condition or RLP queue fullness. After 60 ms, the process repeats for the next 60 ms and the next three MAC RLP packets, and continues iteratively.

Once MACThroughput is estimated, video payload size estimator 72 estimates the video payload size that can be accommodated given the MACThroughput value, as explained above. Then, bandwidth efficient packetizer 74 uses the estimated video payload size and a minimum video packet size value to generate the video packet for submission to RTP/UDP/IP/PPP conversion module 26. The operation of bandwidth efficient packetizer 74 will now be described in greater detail.

In general, video packetization should conform to Network Working Group Request for Comment (RFC) 3016, dated November 2000, if MPEG4 video encoding is used, or to RFC 2190, dated September 1997, or RFC 2429, dated October 1998, if ITU H.263 video encoding is used. RFC3016 outlines the RTP payload format for MPEG4 streams. RFC2429 outlines the RTP payload format for the 1998 version of ITU H.263 streams, and RFC 2190 outlines the RTP format for the original version of ITU H.263 streams.

RFC 3016 specifies that a video packet (a) has to start with video object plane (VOP) header or video packet (VP) header, if any of them exists, (b) can contain more than one VP header, if previous rule is satisfied, (c) can contain only video data without any VOP and VP headers in it, and (d) cannot contain data across two video frames. RFC2190 specifies that a video packet (a) has to start with picture start code (PSC) or group of blocks (GOB), (b) does not have to have GOB header or complete GOB, and (c) does not have to be GOB byte-aligned. RFC2429 specifies that a video packet (a) can start with byte-aligned PSC, GOB header, Slice header, and end of slice ( EOS) marker, and (b) can be a Follow-on packet that does not start with any synchronization codes but allows synchronization codes in the middle of the video packet.

Given the above requirements, video encoder 20 may be configured to insert video data into video buffer 68 in the form of VOPs and VPs for MPEG4, or PSCs, GOBs, and SSCs for H.263. An MPEG4-compliant encoder generates data in the units of VOP or VPs. An H.263 encoder generates data in the units of PSCs, GOBs or SSCs, with GOBs byte-aligned. When RFC 2190 is used, Mode A is the default.

In an exemplary embodiment, the operation of bandwidth efficient packetizer 60 can be expressed as an algorithm that makes use of the following inputs: VideoDataInBuffer, EstimatedVideoPayloadSize, minVPSize. VideoDataInBuffer represents the size of the video in video buffer 68. EstimatedVideoPayloadSize represents the estimated video payload size determined by payload size estimator 72. The value minVPsize is the minimum video packet size to be produced by packetizer 60, and serves to control granularity and bandwidth efficiency. The output of the bandwidth efficient packetization algorithm is one or more video packets for submission to RTP/UDP/IP/PPP conversion module 26. The operation of bandwidth efficient packetizer 74, in an exemplary embodiment, is represented by the following pseudo code:

```
RemainingVideoPayloadSize = EstimatedVideoPayloadSize; VideoPayloadSize = 0;
   VideoPayloadData[ ] : an array;
for (;;)
{
  if (RemainingVideoPayloadSize < minVPSize/2)
        RemainingVideoPayloadSize = 0;
  else if (RemainingVideoPayloadSize < minVPSize)
        RemainingVideoPayloadSize = minVPSize;
  If ((RemainingVideoPayloadSize == 0) || (VideoDataInBuffer == NULL)) break;
  If (VideoDataInBuffer->Size >= RemainingVideoPayloadSize + minVPSize)
  {
     if (RemainingVideoPayloadSize >= (minVPSize/2))
     {
        if (RFC3016 || RFC2429)
           memcpy(VideoPayloadData + VideoPayloadSize, VideoDataInBuffer
>Data,        RemainingVideoPayloadSize);
           VideoPayloadSize += RemainingVideoPayloadSize;
           memcpy(VideoDataInBuffer->Data,
               VideoDataInBuffer->Data + RemainingVideoPayloadSize,
               VideoDataInBuffer->Size - RemainingVideoPayloadSize,
               VideoDataInBuffer->Size -= RemainingVideoPayloadSize);
           VideoDataInBuffer->Fragmented = 1;
        else if (RFC2190)
           memcpy(VideoPayloadData + VideoPayloadSize, VideoDataInBuffer-
>Data,     VideoDataInBuffer->Size);
           VideoPayloadSize += VideoDataInBuffer->Size;
     }
     Make one VideoPacket from VideoPayloadData[ ] with payload size of
        VideoPayloadSize;
     RemainingVideoPayloadSize = 0;
  }
  else
  {
     memcpy(VideoPayloadData + VideoPayloadSize, VideoDataInBuffer->Data,
        VideoDataInBuffer->Size);
     VideoPayloadSize += VideoDataInBuffer->Size;
     RemainingVideoPayloadSize = MAX(RemainingVideoPayloadSize -
        VideoBufferSize->Size - 45, 0);
     if (No more data in buffer || the current TS != the next TS ||
        RemainingVideoPayloadSize == 0 || VideoDataInBuffer->
        Fragmented == 1)
     Make one VideoPacket from VideoPayloadData[ ] with payload size of
        VideoPayloadSize;
     VideoPayloadSize = 0;
    VideoDataInBuffer = the next frame/GOB/slice unit in the video buffer, if any,
or      NULL, if no more data
  }
}
```

As represented by the above pseudo code, bandwidth efficient packetizer 74 produces a video packet based on the EstimatedVideoPayloadSize provided by payload size estimator 72 and minVPSize. RemainingVideoPayloadSize represents the amount of payload still available at any point during the generation of a video packet. Initially, RemainingVideoPayloadSize is equal to the entire EstimatedVideoPayloadSize provided by video payload size estimator 72. VideoPayloadSize represents the actual size of the video payload in a packet, and is initially set to zero. VideoPayloadData[ ] identifies an array of video data segments in video buffer 68.

Packetizer 74 first determines whether the RemainingVideoPayloadSize is less than minVPSize/2. If so, the RemainingVideoPayloadSize is set to zero. Alternatively, if RemainingVideoPayloadSize is less than minVPSize, then the value of RemainingVideoPayloadSize is set to equal minVPSize. Then, if RemainingVideoPayloadSize is equal to zero or VideoDataInBuffer is null, the process resets as there is either no space remaining in the next available MAC RLP packet or no video remaining in video buffer 68.

If the size of VideoInBuffer is greater than or equal to RemainingVideoPayloadSize plus the minVPSize, packetizer 74 next determines whether the RemainingVideoPayloadSize is greater than or equal to minVPSize/2. If so, packetizer 74 determines whether RFC3016 or RFC2429 is applicable. If neither RFC3016 or RFC2429 applies, then packetizer 74 determines whether RFC2190 is applicable, i.e., whether the RTP payload format for the original version of ITU H.263 applies.

If RFC3016 or RFC2429 applies, then packetizer 74 copies (memcpy) video from video buffer 68, as determined by the starting address VideoPayloadData and the offset VideoPayloadSize, to the input buffer identified by VideoDataInBuffer. Initially, VideoPayloadSize is set to zero. The amount of the video copied from video buffer 68 is equal to RemainingVideoPayloadSize, which is initially set to EstimatedVideoPayloadSize. Packetizer 74 then adjusts VideoPayloadSize to equal RemainingVideoPayloadSize. Next, packetizer 74 copies the video data from the input buffer to the address identified by offset RemainingVideoPayload Size in an amount determined by RemainingVideoPayloadSize. The contents of VideoDataInBuffer is then fragmented for packetization.

If RFC2190 applies, then packetizer 74 copies (memcpy) video from video buffer 68, as determined by the starting address VideoPayloadData and the offset VideoPayloadSize, to the input buffer identified by VideoDataInBuffer. Again, VideoPayloadSize is initially set to zero. The amount of the video copied from video buffer 68 is equal to size of the VideoDatainBuffer. The VideoPayloadSize is then made equal to the size of VideoDataInBuffer.

Upon exiting either the RFC3016 /RFC2429 operations or the RFC2190 operations, packetizer 74 next generates a VideoPacket from the VideoPayloadData with a payload size equal to the current value of VideoPayloadSize. The value RemainingVideoPayloadSize is then set to zero. At this point, a video packet has been generated by packetizer 74 for submission to RTP/UDP/IP/PPP conversion module 26. If RemainingVideoPayloadSize is not less than minVPSize, RemainingVideoPayloadSize is not equal to zero, VideoDataInBuffer is not null, and the size of VideoDataInBuffer is not greater than or equal to RemainingVideoPayloadSize+ minVPSize, then packetizer 74 copies data from buffer 68 to VideoDataInBuffer using the address VideoPayloadData plus the offset of VideoPayloadSize. In this case, the amount of data copied is equal to VideoPayloadSize. Then, packetizer 74 sets VideoPayloadSize equal to the size of VideoDataInBuffer.

Packetizer 74 next sets RemainingVideoPayloadSize equal to the maximum of RemainingVideoPayloadSize minus VideoBufferSize and zero. VideoBufferSize represents the size of video buffer 68. If there is no more data in video buffer 68, or a current timestamp (TS) is not equal to the next TS, or RemainingVideoPayloadSize is equal to zero, or VideoDataInBuffer is fragmented, packetizer 74 generates one VideoPacket from the VideoPayloadData with a payload size of VideoPayloadSize, and sets VideoPayloadSize to zero. Otherwise, packetizer 74 sets the VideoDataInBuffer to acquire the next frame, GOB, or slice unit in video buffer 68, if any, or null, if there is no more data in the video buffer.

Figure 8:
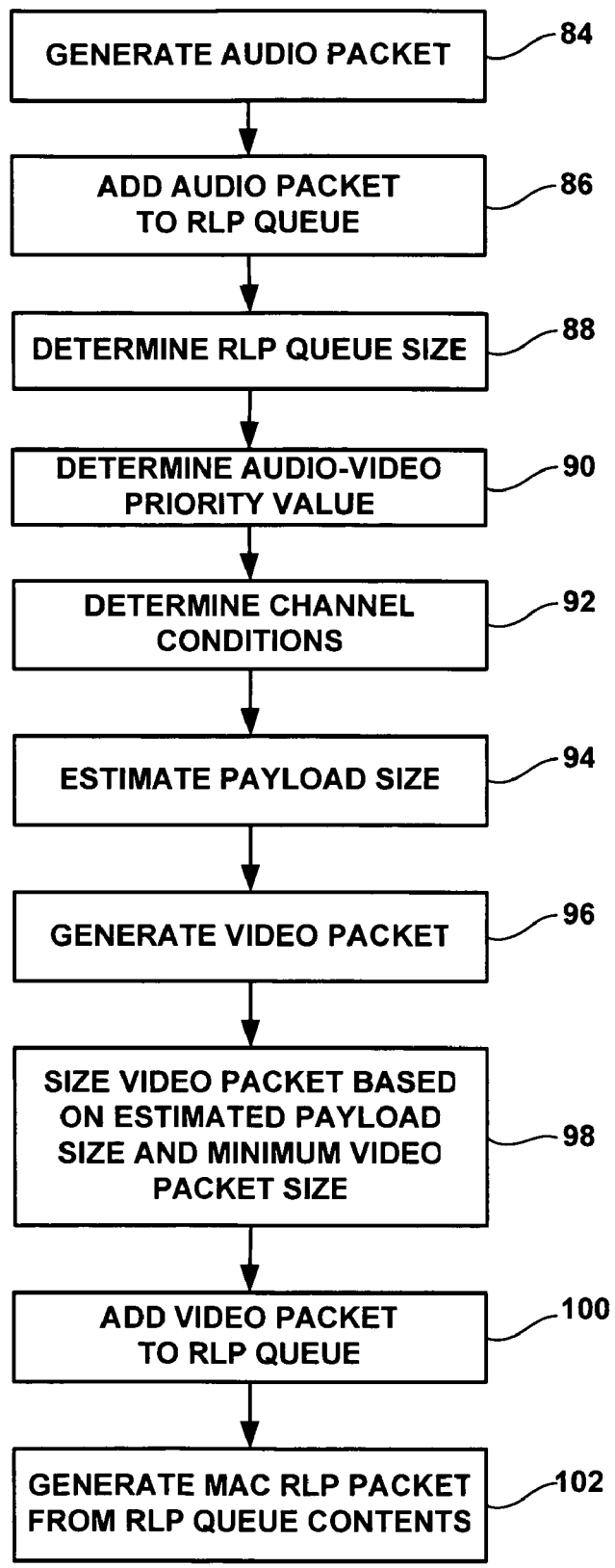
FIG. 8 is a flow diagram illustrating a technique for channel-adaptive video packet shaping.

FIG. 8 is a flow diagram illustrating a technique for channel-adaptive video packet shaping in accordance with an embodiment of this disclosure. As shown in FIG. 8, audio buffer 70 generates an audio packet (84). RTP/UDP/IP/PPP module 26 adds the audio packet to RLP queue 28 (86). Payload size estimator 72 determines RLP queue size (88), the audio-video priority value (90), and channel conditions (92). Based on those determinations, payload size estimator 72 estimates the payload size of the next video packet to be generated (94). Bandwidth efficient packetizer 74 generates the video packet (96) and sizes the video packet based on estimated payload size and a minimum video packet size (98). Bandwidth efficient packetizer 74 adds the video packet to RLP queue 28 (100). MAC layer module 30 generates a MAC RLP packet from the contents of RLP queue 28 (102).

Channel-adaptive video packet shaping, as described in this disclosure, supports higher audio data priority. Without channel-adaptive video packet shaping, audio is often delayed by a large video packets. Fragmentation of video frames according to the packet shaping techniques described in this disclosure provides space for audio packets to be transmitted in the next available MAC RLP packet. Although fixed length video packet sizing can reduce audio delay in many instances, such an approach does not adapt to channel conditions and can be inefficient in terms of bandwidth consumption. Channel-adaptive video packet shaping provides flexibility to prioritize audio and video data. Different values of the audio-video priority value (MACPredNumberPlus) and minimum video packet size (minVPSize) can be specified to achieve a desired tradeoff between audio and video priority.

In addition, channel-adaptive packet shaping can offer nearly constant audio delay performance, resulting in smooth audio conversations despite poor channel conditions. In some cases, audio delay performance may be comparable to performance without video. Video throughput is adaptable to audio throughput and channel conditions. In particular, video throughput can be changed adaptively according to available bandwidth, and video throughput can be increased when audio throughput reduces. Advantageously, channel-adaptive video packet shaping may be susceptible to low-complexity implementation, requiring only a few lines of code in some embodiments, as demonstrated in this disclosure. Also, in most embodiments, there is no need to modify decoding system 14.

The techniques described in this disclosure may be implemented within a general purpose microprocessor, digital signal processor (DSP), application specific integrated circuit (ASIC), field programmable gate array (FPGA), or other equivalent logic devices. For example, video encoder system 12, and its components and modules, may be implemented as parts of an encoding process, or coding/decoding (CODEC)

process, running on a digital signal processor (DSP) or other processing device. Accordingly, components described as modules may form programmable features of such a process, or a separate process. Video encoder system 12 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

Various embodiments have been described. These and other embodiments are within the scope of the following claims.

The invention claimed is:

1. A method comprising:
generating an audio packet by an audio buffer;
estimating throughput of a wireless channel by a video packetizer; and
generating a video packet by the video packetizer with a video packet size determined based on the estimated throughput and a size of the audio packet.

2. The method of claim 1, further comprising placing the audio packet and the video packet in an output queue, wherein the video packet size is determined based on the estimated throughput, the size of the audio packet, and a size of buffered data in the output queue prior to placement of the video packet in the output queue.

3. The method of claim 1, further comprising placing the audio packet and the video packet in an output queue, and generating a medium access control (MAC) layer packet based on at least some of the contents of the output queue.

4. The method of claim 1, further comprising receiving audio frames at first periodic intervals, and generating medium access control (MAC) layer packets at second periodic intervals, wherein generating an audio packet includes generating an audio packet for each of the audio frames, and adding the audio packet to a next available MAC layer packet.

5. The method of claim 1, further comprising receiving audio frames at first periodic intervals, and generating medium access control (MAC) layer packets at second periodic intervals, wherein generating an audio packet includes generating an audio packet that bundles at least two of the audio frames, and adding the audio packet to a next available MAC layer packet.

6. The method of claim 1, further comprising placing the audio packet and the video packet in an output queue, and generating a medium access control (MAC) layer packet based on at least some of the contents of the output queue, wherein the video packet size is based on the size of the audio packet, the estimated throughput, and a size of buffered data in the output queue prior to placement of the video packet in the output queue.

7. The method of claim 1, further comprising estimating the throughout based on one or more of a current wireless channel transmit rate, wireless base station activity, and transmit power limitations.

8. The method of claim 1, wherein the video packet size is sized to avoid substantial delay in transmission of the audio packet over the wireless channel.

9. The method of claim 1, further comprising receiving a plurality of video frames, and adjusting a video encoding rate based on an amount of unpacketized video frame data.

10. The method of claim 1, wherein the video packet size is determined at least in part based on a priority value that assigns a priority to the audio packet over the video packet, and wherein the video packet size for a given estimated throughput increases as the priority value decreases.

11. The method of claim 1, wherein the video packet size is greater than or equal to a minimum video packet size.

12. The method of claim 1, further comprising generating a physical layer packet based on the audio packet and the video packet, and transmitting the physical layer packet to a remote device to support a mobile wireless video telephony conference.

13. The method of claim 12, wherein the physical layer packet conforms to the CDMA2000 1x EV-DO, Release 0, standard.

14. A system comprising:
an audio encoder that generates audio data;
an audio buffer that receives the audio data and outputs an audio packet;
a video encoder that generates video data;
a packetizer that estimates throughput of a wireless channel, and generates a video packet from the video data with a video packet size determined based on the estimated throughput and a size of the audio packet.

15. The system of claim 14, further comprising an output queue that receives the audio packet and the video packet, wherein the video packet size is determined based on the estimated throughput, the size of the audio packet, and a size of buffered data in the output queue prior to placement of the video packet in the output queue.

16. The system of claim 14, further comprising an output queue that receives the audio packet and the video packet, and a medium access control (MAC) layer module that generates a MAC layer packet based on at least some of the contents of the output queue.

17. The system of claim 14, wherein the audio buffer receives audio frames at first periodic intervals, and generates an audio packet for each of the audio frames, and the MAC layer module generates medium access control (MAC) layer packets at second periodic intervals, and adds the audio packet to a next available MAC layer packet.

18. The system of claim 14, wherein the audio buffer receives audio frames at first periodic intervals, and bundles at least two of the audio frames to form the audio packet, and the MAC layer module generates medium access control (MAC) layer packets at second periodic intervals, and adds the audio packet to a next available MAC layer packet.

19. The system of claim 14, wherein the packetizer estimates the throughout based on one or more of a current wireless channel transmit rate, wireless base station activity, and transmit power limitations.

20. The system of claim 14, wherein the video packet size is sized to avoid substantial delay in transmission of the audio packet over the wireless channel.

21. The system of claim 14, wherein the video encoder generates a plurality of video frames, and adjusts a video encoding rate based on an amount of unpacketized video frame data.

22. The system of claim 14, wherein the packetizer determines the video packet size at least in part based on a priority value that assigns a priority to the audio packet over the video packet, wherein the video packet size for a given estimated throughput increases as the priority value decreases.

23. The system of claim 14, wherein the video packet size is greater than or equal to a minimum video packet size.

24. The system of claim 14, further comprising a physical layer module that generates a physical layer packet based on the audio packet and the video packet, and transmits the physical layer packet to a remote device to support a mobile wireless video telephony conference.

25. The system of claim 24, wherein the physical layer packet conforms to the CDMA2000 1x EV-DO, Release 0, standard.

26. A non-transitory computer-readable storage medium comprising computer-executable instructions to cause a processor to:
generate an audio packet;
estimate throughput of a wireless channel; and
generate a video packet with a video packet size determined based on the estimated throughput and a size of the audio packet.

27. The non-transitory computer-readable storage medium of claim 26, further comprising computer-executable instructions to cause a processor to place the audio packet and the video packet in an output queue, wherein the video packet size is determined based on the estimated throughput, the size of the audio packet, and a size of buffered data in the output queue prior to placement of the video packet in the output queue.

28. The non-transitory computer-readable storage medium of claim 26, further comprising computer-executable instructions to cause a processor to place the audio packet and the video packet in an output queue, and generate a medium access control (MAC) layer packet based on at least some of the contents of the output queue.

29. The non-transitory computer-readable storage medium of claim 26, further comprising computer-executable instructions to cause a processor to receive receiving audio frames at first periodic intervals, and generate medium access control (MAC) layer packets at second periodic intervals, wherein generation of an audio packet includes generation of an audio packet for each of the audio frames, and add the audio packet to a next available MAC layer packet.

30. The non-transitory computer-readable storage medium of claim 26, further comprising computer-executable instructions to cause a processor to receive audio frames at first periodic intervals, and generate medium access control (MAC) layer packets at second periodic intervals, wherein generation of an audio packet includes generation of an audio packet that bundles at least two of the audio frames, and add the audio packet to a next available MAC layer packet.

31. The non-transitory computer-readable storage medium of claim 26, further comprising computer-executable instructions to cause the processor to estimate the throughout based on one or more of a current wireless channel transmit rate, wireless base station activity, and transmit power limitations.

32. The non-transitory computer-readable storage medium of claim 26, wherein the video packet size is sized to avoid substantial delay in transmission of the audio packet over the wireless channel.

33. The non-transitory computer-readable storage medium of claim 26, further comprising computer-executable instructions to cause the processor to receive a plurality of video frames, and adjust a video encoding rate based on an amount of unpacketized video frame data.

34. The non-transitory computer-readable storage medium of claim 26, wherein the video packet size is determined at least in part based on a priority value that assigns a priority to the audio packet over the video packet, and wherein the video packet size for a given estimated throughput increases as the priority value decreases.

35. The non-transitory computer-readable storage medium of claim 26, wherein the video packet size is greater than or equal to a minimum video packet size.

36. The non-transitory computer-readable storage medium of claim 26, further comprising computer-executable instructions to cause a processor to generate a physical layer packet based on the audio packet and the video packet, and transmit the physical layer packet to a remote device to support a mobile wireless video telephony conference.

37. The non-transitory computer-readable storage medium of claim 36, wherein the physical layer packet conforms to the CDMA2000 1x EV-DO, Release 0, standard.

38. A system comprising:
means for generating an audio packet;
means for estimating throughput of a wireless channel; and
means for generating a video packet with a video packet size determined based on the estimated throughput and a size of the audio packet.

39. The system of claim 38, further comprising means for placing the audio packet and the video packet in an output queue, wherein the video packet size is determined based on the estimated throughput, the size of the audio packet, and a size of buffered data in the output queue prior to placement of the video packet in the output queue.

40. The system of claim 38, further comprising placing the audio packet and the video packet in an output queue, and generating a medium access control (MAC) layer packet based on at least some of the contents of the output queue.

* * * * *